United States Patent [19]
Griffen

[11] Patent Number: 4,691,290
[45] Date of Patent: Sep. 1, 1987

[54] CREEP-COMPENSATED WEIGHING APPARATUS

[75] Inventor: Neil C. Griffen, Westerville, Ohio

[73] Assignee: Reliance Electric Company, Cleveland, Ohio

[21] Appl. No.: 638,272

[22] Filed: Aug. 6, 1984

[51] Int. Cl.$^4$ .................. G01G 23/14; G01G 19/413
[52] U.S. Cl. .................................. 364/567; 364/466; 364/571; 177/25
[58] Field of Search ............. 364/567, 571, 464, 466; 177/25, 164, 165

[56] References Cited

U.S. PATENT DOCUMENTS

| | | | |
|---|---|---|---|
| 4,080,657 | 3/1978 | Caldicott et al. | 364/567 |
| 4,139,892 | 2/1979 | Gudea et al. | 364/567 |
| 4,412,298 | 10/1983 | Feinland et al. | 364/567 |
| 4,535,854 | 8/1985 | Gard et al. | 177/1 |
| 4,535,857 | 8/1985 | Haze | 364/571 |
| 4,545,445 | 10/1985 | Naito | 364/567 |

Primary Examiner—Errol A. Krass
Assistant Examiner—H. R. Herndon
Attorney, Agent, or Firm—Roy F. Hollander

[57] ABSTRACT

A digital scale compensated for creep by first obtaining and storing a mathematical representation of creep as a function of time for the particular scale. The current "creep state" of the scale is continually calculated, stored and used to correct the current weight indication for creep. The current creep state is obtained by calculating the increment of creep since the previous determination of creep state and combining it with the stored previous creep state.

28 Claims, 8 Drawing Figures

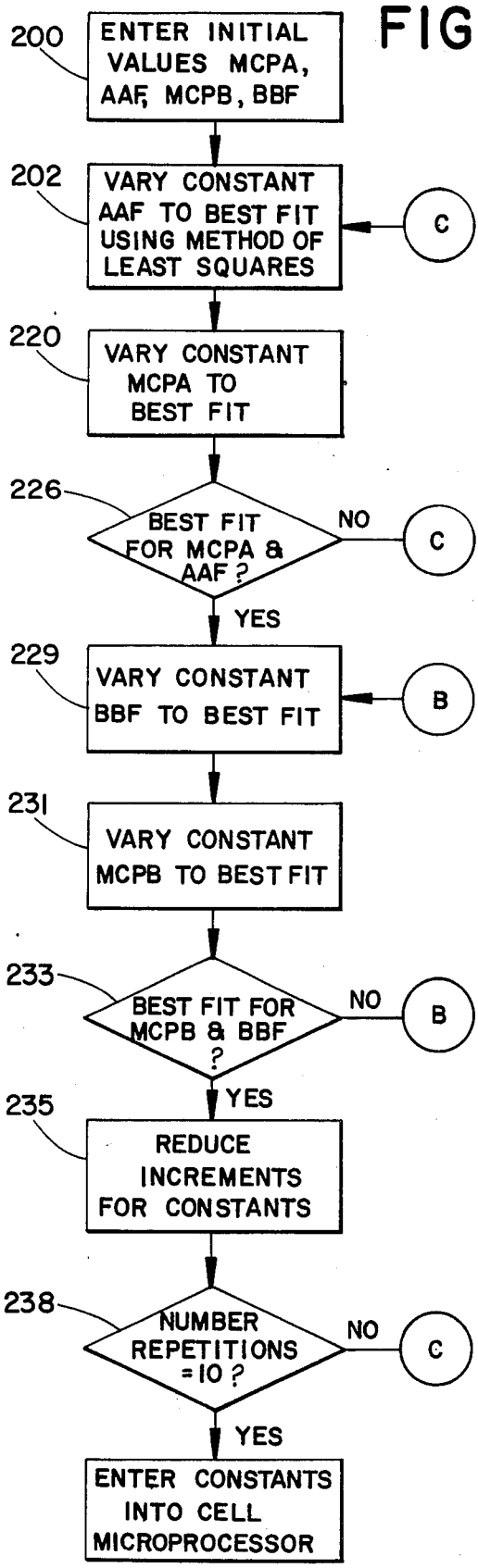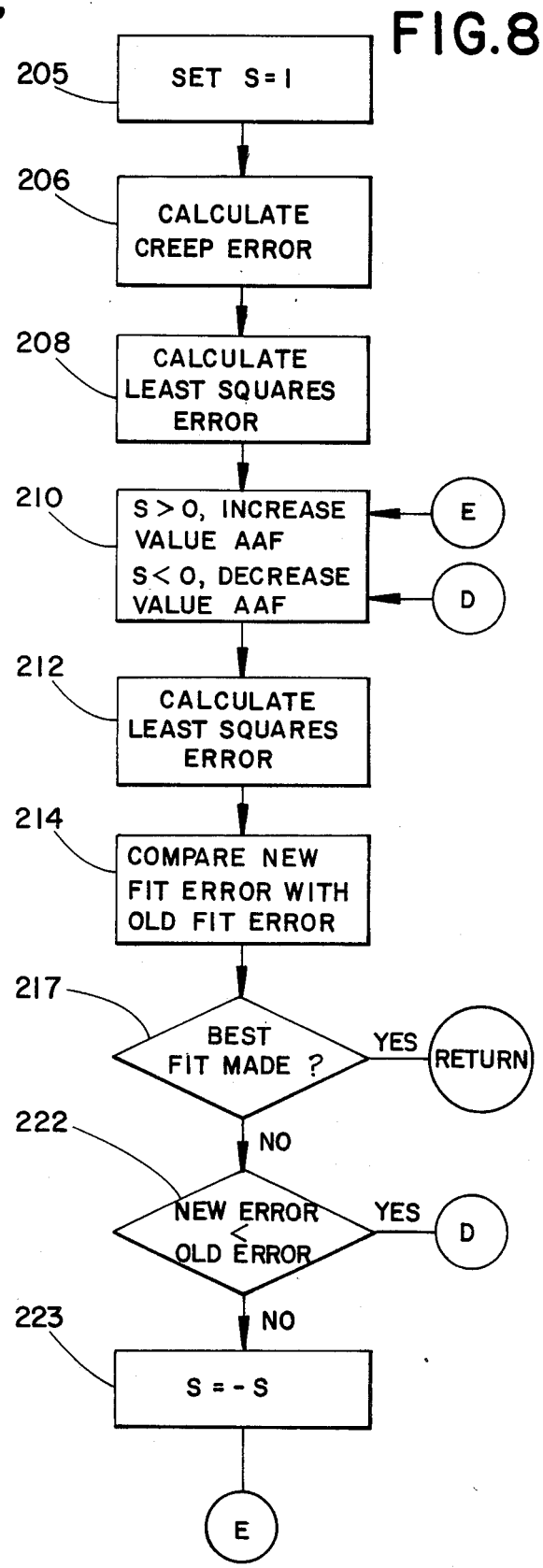

CREEP-COMPENSATED WEIGHING APPARATUS

BACKGROUND OF THE INVENTION

This invention relates to force-measuring apparatus such as a weighing scale and more particularly to a force-measuring apparatus compensated for creep.

The phenomenon known as creep encountered in a force-measuring device such as a load cell is exhibited as a change, either increase or decrease, in the output of the load cell with time under an applied load. When the load is removed the cumulative change in output, the creep error, remains. The output of the load cell then creeps toward zero as the creep effect of the load disappears. As different loads are applied for different durations and at different intervals the creep will vary accordingly.

The creep phenomenon is not well understood but is believed to have two main sources. The first source is changes in the grain structure of the counterforce. In theory, this source of creep results from mobile atoms in the crystalline grain structure of the load cell counterforce seeking positions of minimum energy in the lattice. Stress applied to the counterforce alters the energy pattern and causes the mobile atoms to seek new positions. Such migrations alter the lattice dimensions and change the strain detected by the strain gauges. When the stress is removed from the load cell the atoms migrate back toward their original positions and the output of the load cell creeps back to its original, or zero balance, reading. The error in the load indication introduced by the creep phenomenon is a function of both the magnitude of the load and the time elapsed from its application or removal.

A second source of creep is the relaxing of the adhesive bond between the counterforce and the strain gage and/or between the grids of the gage and the gage backing. Often the two aforementioned sources (counterforce grain structure and adhesive bond) tend to cancel each other. Strain gages usually are available with differing geometrical configurations which compensate more or less for the creep in the counterforce to which the gages will be attached. Thus, gages are matched to the counterforce to minimize creep. Although such methods greatly reduce the effects of the inherent creep on the load cell output further corrections are still needed for high accuracy applications.

Until recently, little effort was made to electronically compensate for the effects of creep on weighing accuracy. In U.S. Pat. No. 4,412,298 issued Oct. 25, 1983 to Feinland et al, a method is suggested for compensating for creep in a digital weighing scale. In that patent, a tare weight is stored prior to application of a load. After a load is applied and scale motion has ceased, weight readings are taken at intervals. If the cumulative difference in readings exceeds a predetermined amount the difference is added to the stored tare weight so that a true tare weight is maintained after removal of the load.

SUMMARY OF THE INVENTION

According to the present invention, there is provided a weighing or other force-measuring apparatus compensated for creep by continually predicting the current "creep state" of the apparatus and modifying the force indication according to this creep state. The current creep state of the apparatus depends upon the recent creep history of the apparatus, that is, the magnitudes and durations of the forces previously applied, and current creep factors of magnitude and duration of the force currently applied. By utilizing the creep history (or the most recent previous creep state) as the initial condition, the current creep state may be predicted from the magnitude and duration of the current load. The current creep state so determined is then used to compensate current force indications and is stored for use in predicting the next current creep state.

A creep-compensated weighing apparatus according to the present invention includes a weighing mechanism, means for obtaining a representation of the weight on the weighing mechanism, means for predicting the creep state of the weighing mechanism using the weight representation, and means for combining the creep state with the weight representation to provide a corrected weight representation.

A method according to the present invention for correcting the output of a weighing apparatus for creep comprises obtaining a representation of the weight applied to the weighing apparatus, predicting the creep state of the weighing apparatus, and combining the creep state with the weight representation to provide a corrected weight representation.

When the apparatus is first placed in use or has had no load applied for a substantial period of time (about 30 minutes) all past creep effects will be small. The creep state of the apparatus will then be essentially zero. So long as no load is applied to the apparatus the creep state will remain zero. Upon application of a load, however, creep will occur and be calculated as a function of the magnitude and duration of the applied load. The creep so calculated becomes the current creep state of the apparatus and is stored. As successive loads are applied to the apparatus the increments of creep due to those loads and their duration are continually calculated and combined with the most recent creep state to determine the current creep state of the apparatus. The current creep state is used to correct the weight readings and also is stored for use in determining the next creep state. Thus, the current creep state of the weighing apparatus is always known and available for compensating the weighing apparatus.

BRIEF DESCRIPTION OF THE DRAWINGS

FIGS. 7 and 8 are flow charts of a program for determining the creep calculation constants for a particular weighing apparatus incorporating the present invention.

GENERAL DESCRIPTION

Figure 1:
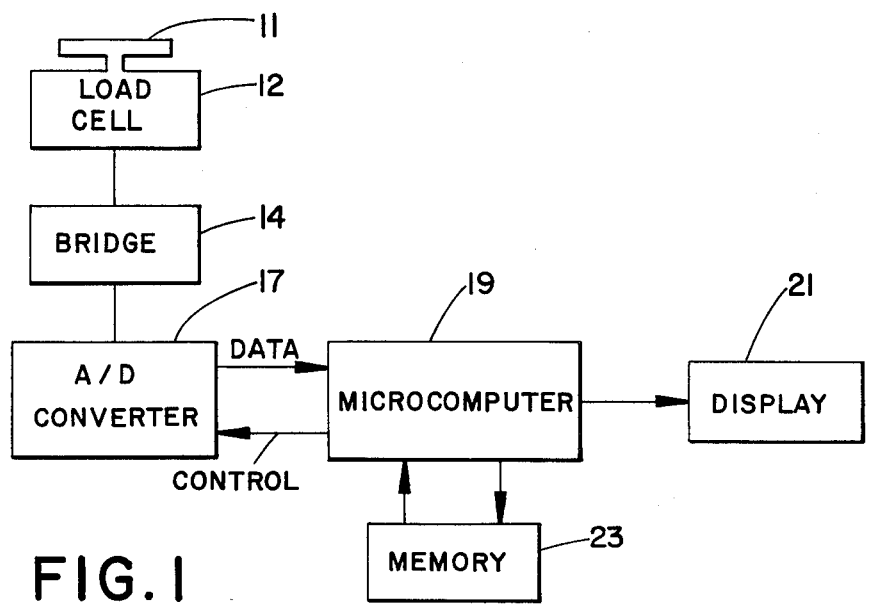
FIG. 1 is a block diagram of a microcomputer controlled weighing apparatus subject to the effects of creep and incorporating the present invention.

Referring now to the drawing and initially to FIG. 1, a typical force measuring apparatus subject to the effects of creep is the microcomputer controlled weighing scale shown there. The scale of FIG. 1 has a weighing mechanism including a weight receiving pan 11, a load cell 12 and a strain gage bridge 14. A load placed on pan 11 produces strain in load cell 12 which is detected by the strain gages of the load cell and unbalances bridge 14. The bridge provides an analog weight signal to A/D (analog-to-digital) converter 17. The analog weight signal is converted to digital form by, converter 17 under control of microcomputer 19 and provided to the microcomputer for processing and display in digital form on display device 21. Electronic memory 23 is associated with microcomputer 19 and may include both RAM (Random Access Memory) and ROM (Read Only Memory).

Figure 2:
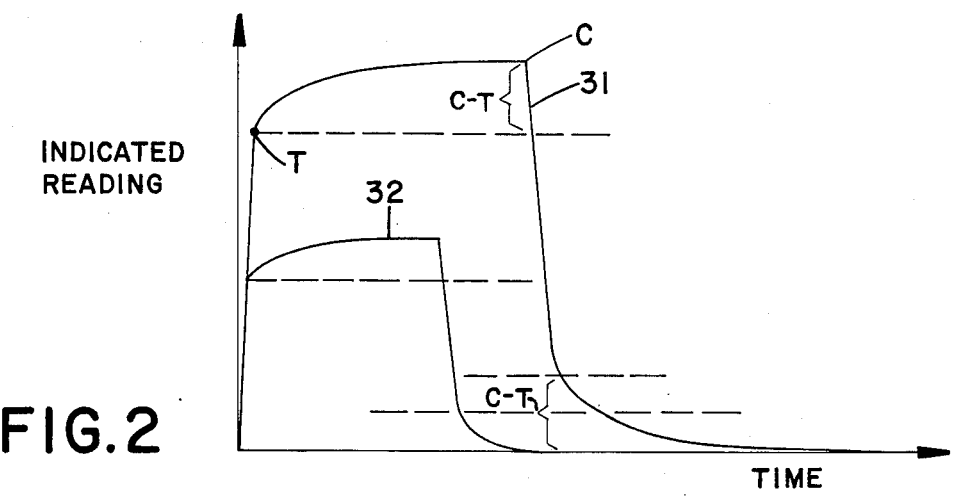
FIG. 2 is a plot illustrating the effects of creep on an analog weight signal.

FIG. 2 illustrates the effects of creep on the analog weight signal from bridge 14. As seen in curve 31 of FIG. 2, the weighting apparatus rather quickly provides a true weight indication at T. The weight indication almost immediately begins to change, however, from the effects of creep and over a longer period of time approaches a value C so that the weight indication comprises the true weight value T plus the creep C minus T. When the weight is removed from pan 11 the weight indication does not immediately return to zero but to a value C minus T and creeps toward zero. The indicated weight of another object placed on scale pan 11 would be affected by the creep resulting from the previous weight.

As indicated by the difference between the larger curve 31 and the smaller curve 32 of FIG. 2, the amount of creep depends upon both the magnitude of the applied load and the duration of application. A force measuring apparatus such as a weighting scale in typical commercial use may have weights of substantially different magnitudes applied to it for different durations at short intervals. The time required for the weighting mechanism to become "creeped out", that is, reach the substantially maximum creep value for an applied load, represented by the distance C-T in FIG. 2, is on the order of thirty minutes or greater. Accordingly, the scale mechanism will not usually be "creeped out" from the time one weight is removed from the scale to the time another is applied. The creep resulting from the newly applied load will depend upon the "creep state" of the weighing mechanism at the time the new load was applied along with the magnitude and duration of application of the newly applied load.

Figure 3:
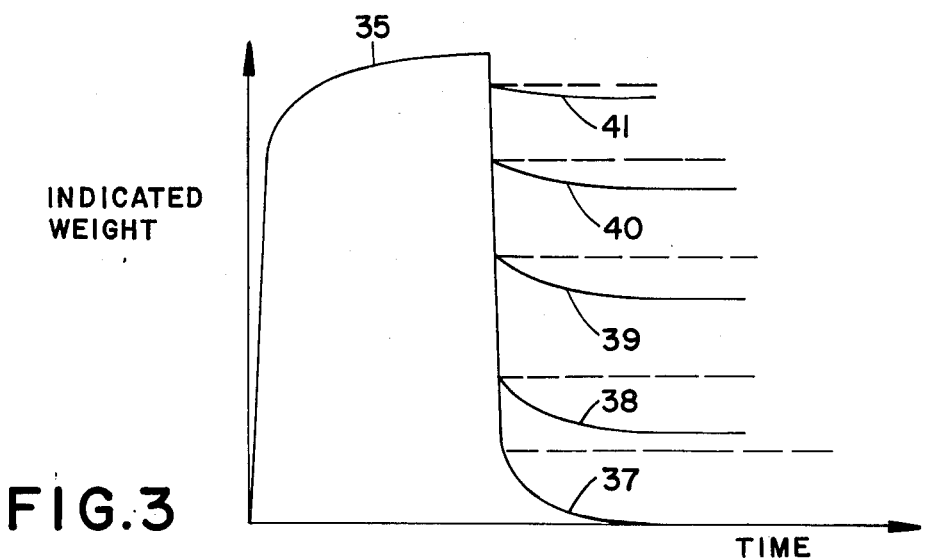
FIG. 3 is a plot illustrating the creep resulting from changes in the magnitude of load on a weighing apparatus.

This effect is illustrated in FIG. 3 where the curve 35 represents the application of a full scale load. Curves 37 to 41 illustrate the creep resulting from replacement of the full scale load by loads ranging from zero in the case of curve 37 to a load very close to full scale in the case of curve 41. The creep error in the indicated weight reading for each newly applied load will initially be equal to the "creep state" of the weighing mechanism under the previously applied load and will creep toward the maximum value of creep for the newly applied load. Each of the curves 37 to 41 in FIG. 3 results in decreasing indicated weight readings because the curve 35 represents full load applied for a duration such that the weighing mechanism was substantially "creeped out". It will be appreciated that in the case of a smaller initial load applied for a shorter duration followed by application of a larger load the creep curves analogous to curves 37 to 41 would have positive slopes.

FIGS. 2 and 3, in summary, illustrate that the error due to creep in a weighing mechanism is dependent upon the "creep state" of the mechanism which varies with the sequence of applied loads and their duration. Calculation of this "creep state" either periodically or upon the occurrence of a specified event such as application of a new load, permits the creep error to be corrected. In accordance with this invention, the creep state is calculated from the recent loading history of the scale to determine and compensate for the creep error. The calculation and compensation are done digitally as by microcomputer 19.

One approach to determining the creep state is to periodically calculate the incremental creep, that is, the change in creep during the period, and combine it with the creep state at the beginning of the period to obtain the current creep state which is equal to the creep error. Thus, the current creep state is the comulative result of all creep changes that have occurred in the operation of the scale. In this approach the maximum incremental creep for a very long time period such that the system has "creeped out" can be determined as follows:

$$MC = \frac{MCP * WGT}{SP} - DCP \quad (1)$$

where:
MC is the maximum incremental creep;
MCP is the maximum possible creep, that is, the creep that would be observed when full load is applied to an unloaded system which is "creeped out";
WGT is the indicated weight usually expressed in counts;
DCP is the initial state of creep of the system expressed in the same units as WGT, and
SP is the span or full load indication minus no load indication.

Consider further that the state of creep would equal zero for an unloaded scale system that is "creeped out" and would equal the maximum possible creep for a system that has "creeped out" with full load applied. The state of creep would change from the first value toward the second as weight is added to the system.

The above equation (1) contains no time variable since it represents creep only after a long period of time has elapsed. Predictions of the current creep state for shorter periods can be made by introducing a time related term to equation (1) and adding the previous creep state to the incremental creep as in the equation below, $$DCP(T) = \quad (2)$$
$$AA * \left( \frac{MCP}{SP} * WGT - DCP(T-1) \right) + DCP(T-1)$$

where DCP(T) is the current state of creep, DCP(T−1) is the previous state of creep and AA is an expression for the time between the previous creep determination and the current determination. For apparatus in which weight indications are read at constant time intervals AA is a constant. If the interval between readings is not constant, then AA will vary with the time since the last reading. For example, AA is a variable when the time between weight readings is a function of the load applied which can occur in a microcomputer controlled scale such as that of FIG. 1 employing an integrating type A-D converter. The conversion time of the A-D converter will vary with the magnitude of the load. In this type of situation AA can be expanded to:

$$AA = A * TMIN * (1 + WGT * D) \qquad (3)$$

where TMIN is the time between weight readings at no load, A relates to the rate at which creep occurs, and D is a constant such that the term TMIN * (1+WGT * D) represents the time between weight readings for loads not equal to zero. D can be determined as follows:

$$D = \frac{TMAX - TMIN}{TMIN * SP} \qquad (4)$$

where TMAX is the time between weight readings at full load. Equation (2) then becomes $$DCP(T) = \left( \frac{MCP}{SP} * WGT - DCP(T-1) \right) * A * TMIN * (1 + WGT * D) + DCP(T-1) \qquad (5)$$

The constants A and TMIN can be combined yielding a simpler form, $$DCP(T) = DCP(T-1) + \left( \frac{MCP * WGT}{SP} - DCP(T-1) \right) * (1 + WGT * D) * AT$$

where AT=A * TMIN.

Now MCP is normalized, that is, the value for MCP is replaced by the value of MCP/SP and the equation becomes:

$$DCP(T) = DCP(T-1) + \qquad (6)$$
$$(MCP * WGT - DCP(T-1)) * (1 + WGT * D) * AT$$

where MCP is the normalized maximum possible creep. The constants MCP, D, and AT will vary somewhat for each particular force-measuring apparatus or weighing system. The values of these constants can be determined during set-up of the scale system and stored in memory.

It has been discovered that creep errors can be further reduced by calculating creep state with a series of correction expressions of the form of equation (6). Some of the expressions tend to predict short term creep effects while others tend to predict longer term effects. Such a series having A and B components is:

$$DCP(T) = DCPA(T-1) + (MCPA * WGT - DCPA(T- \qquad (7)$$
$$1)) * (1 + WGT * D) * AAF + DCPB(T-1) + (MCPB *$$
$$WGT - DCPB(T-1)) * (1 + WGT * D) * BBF$$

Here the expression containing MCPB and BBF terms, for example, tends to correct for creep error that occurs in the first few seconds and reaches its maximum value in a few minutes. The expression containing the MCPA and AAF terms tends to correct for creep that occurs after the first correction term reaches its maximum value. If even more correction is needed, more terms could be added in like manner.

The constants vary somewhat for each particular force-measuring apparatus or weighing system. The values of these constants can be determined during set-up of the scale system and stored in memory. The determination can be made through an iterative process of selecting sample values for the constants and calculating creep and then comparing the results to actual creep data obtained by taking readings under load at, for example, ten to fifteen time intervals from a few seconds to about fifteen minutes after load application. The calculated creep is compared to measured creep, the selected constants modified in view of the comparison and the process repeated until the values of the constants are determined to the desired accuracy. Such a procedure is described in detail hereinafter.

Figure 4:
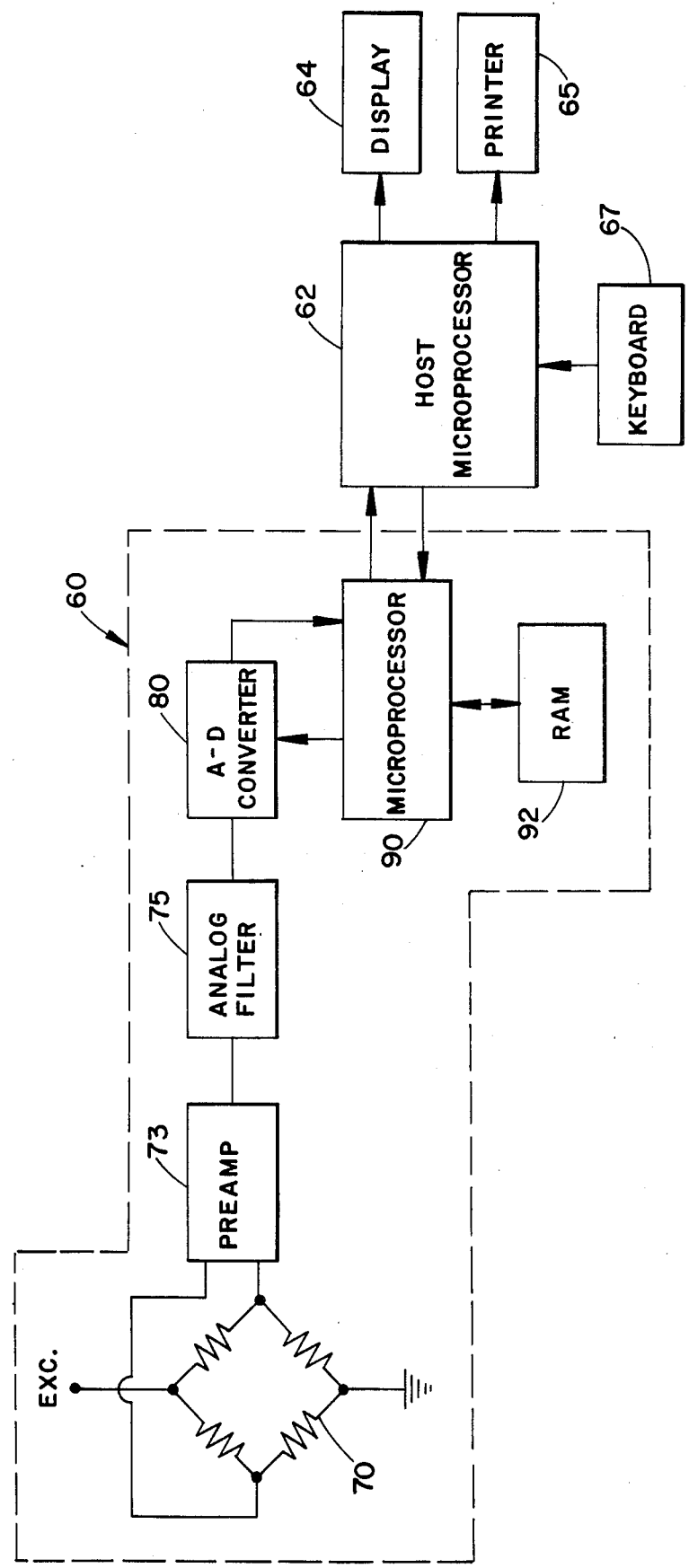
FIG. 4 is a block diagram, in greater detail than that of FIG. 1, of a preferred form of weighing apparatus incorporating the present invention.

Referring now to FIG. 4, a preferred form of weighting apparatus incorporating the present invention includes a "digital load cell" generally designated 60 interfaced with a "host" or scale system microcomputer 62. Along with other functions, microcomputer 62 controls a display 64 and a printer 65 and receives operator information through a keyboard 67. The weighing system of FIG. 5 differs from the more typical arrangement of FIG. 1 primarily in that various electronic circuits have been combined on the same printed circuit board with the A-D converter and a dedicated load cell microprocessor and memory added. The result is the digital load cell which may be calibrated, compensated and corrected as a unit in itself and incorporated into a variety of microcomputer controlled scale systems. When so incorporated the digital load cell is interfaced with the scale or host microcomputer, such as microcomputer 62 in FIG. 4.

In the form shown in FIG. 4, digital load cell 60 includes a strain gage bridge 70 which provides an analog weight signal to a preamplifier 73 and then through a filter 75 and an electronic switch 77 to an A-D converter 80. The A-D converter is preferably of the triple slope integrating type. Operation of the digital load cell is controlled by a programmed microprocessor 90 and associated nonvolatile RAM memory 92. Microprocessor 90 is preferably an INTEL Model 8049.

In addition to controlling the operation of digital load cell 60, microprocessor 90 with RAM 92 corrects the weight data from A-D converter 80 to compensate for the effects of creep in accordance with the present invention. The microprocessor also communicates with host microcomputer 62, and transmits thereto weight data which may be further processed by the host microcomputer and displayed on display device 64.

Figure 5:
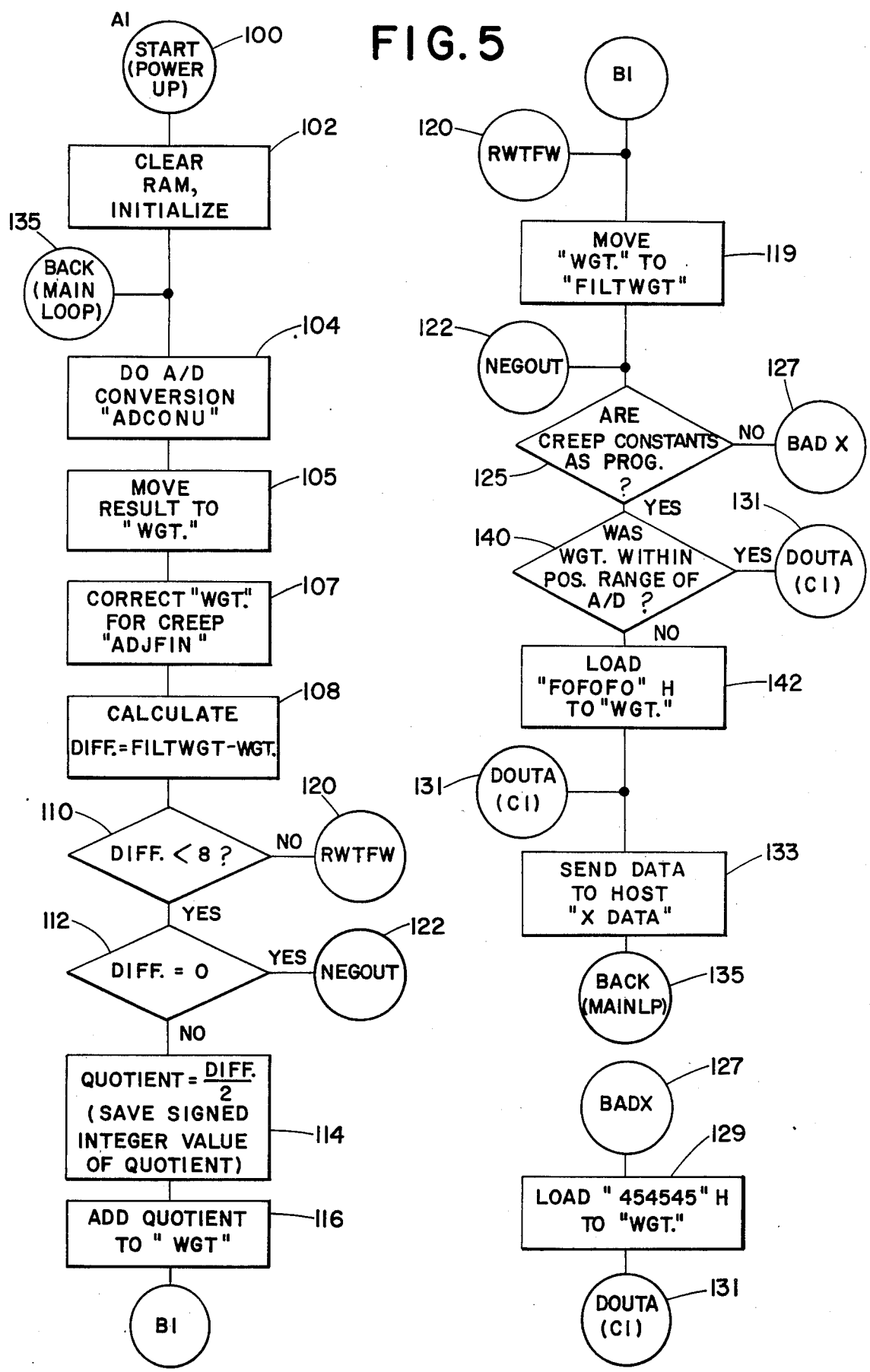
FIG. 5 is a flow chart illustrating the operation of weighing apparatus incorporating the present invention.
Figure 6:
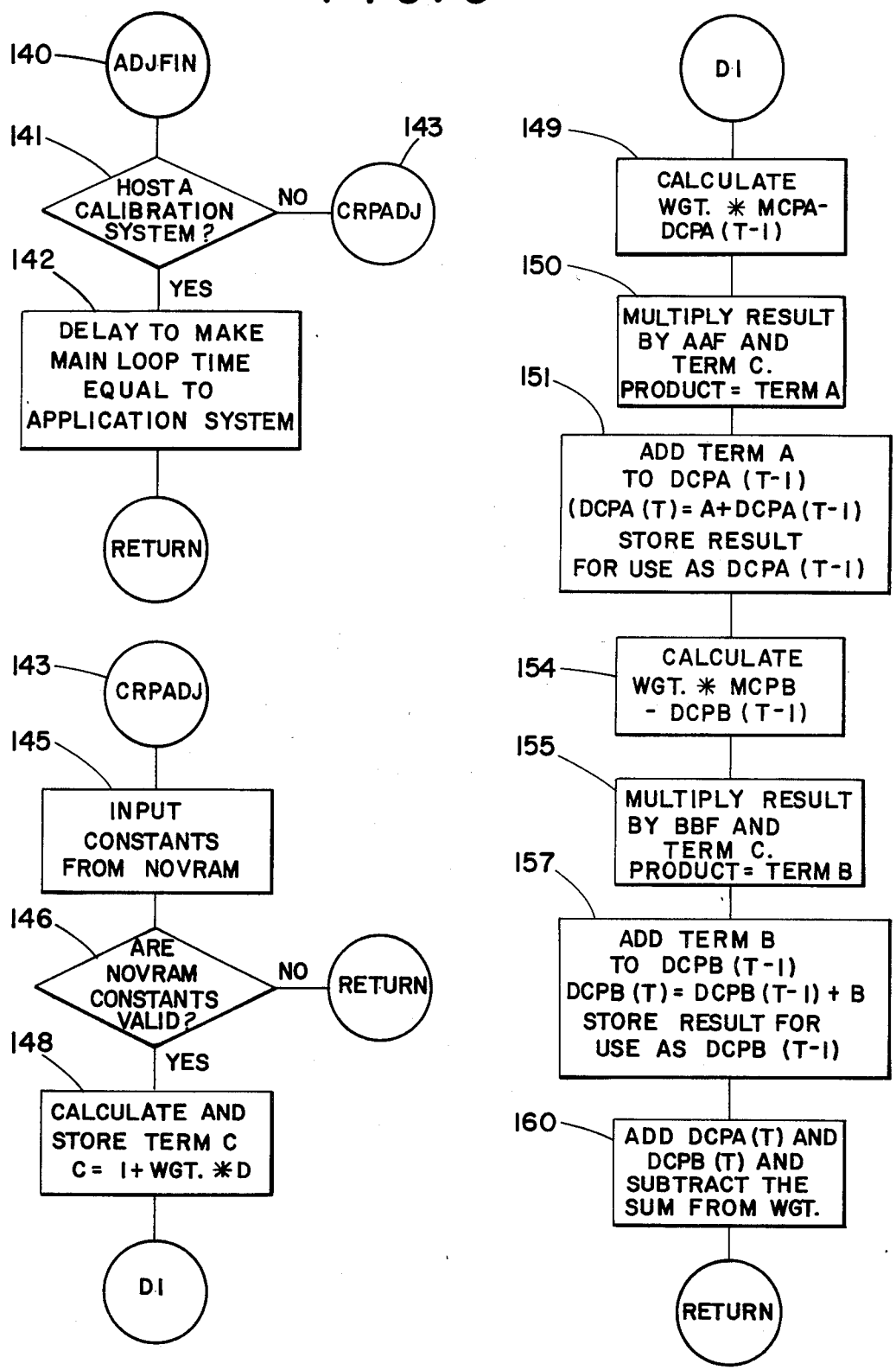
FIG. 6 is a flow chart of the creep correction subroutine in the flow chart of FIG. 5.

The digital load cell 60 of FIG. 4 under control of microprocessor 90 operates as illustrated in the flow charts of FIGS. 5 and 6 and defined in detail in the program listing attached hereto as Exhibit A. The microprocessor 90 is able to communicate with host microcomputer 62 in either a calibration mode or an application mode. Operation in the calibration mode would occur for inputing creep calculation constants into the digital load cell. The description following will describe the application mode.

Referring now to FIGS. 5 and 6, after START at block 100 the system is initialized at block 102 to reset all portions of the system to their initial conditions. An A-D conversion to obtain weight data is then performed at block 104 through a subroutine called "AD- CONV". The weight reading resulting from the A-D conversion is moved at block 105 to the "WGT" register. At block 107 "WGT" is corrected for creep by means of a program subroutine called "ADJFIN" illustrated in FIG. 6 and described below. Next, at block 108 the difference is calculated between the creep corrected "WGT" and a value "FILTWT" which is essentially the final corrected weight value obtained from the previous A-D conversion.

The program then performs tests at blocks 110 and 112 in order to determine the range of the difference (DIFF) calculated at block 108 and to then operate on "WGT" in accordance with the difference. If, at block 110, the difference is less than eight units and, at block 112, is greater than zero then the program continues in the main loop to block 114. There, and at the following block 116, a smoothing or filtering operation is performed by dividing the difference in half, saving the signed integer value of the resulting quotient and adding the quotient to the corrected value of "WGT". Then, at block 119 "WGT" is moved to the "FILTWT" register. If, however, at block 110 the difference between "WGT" and "FILTWT" is determined to be greater than eight units the program bypasses the smoothing operation at blocks 114 and 116 and proceeds through Point 120 to block 119. Thus, in either of the two cases described the most recent weight indication, "WGT" becomes "FILTWT" for the next program cycle.

The remaining and final alternative of the test at blocks 110 and 112 is that DIFF is equal to zero so that "FILTWT" is equal to "WGT". In that case the program bypasses blocks 114, 115 and 119 as redundant and reenters at point 122.

At block 125 the program tests the validity of the creep constants used in the creep correction subroutine "ADJFIN" which are stored in RAM 92. If the creep constants are determined to be invalid the program proceeds through point 127 to block 129 where an "impossible" value is loaded into the "WGT" register to flag invalid data. The program then proceeds through the main loop at point 131 to block 133. There, the digital load cell data is transmitted to host microcomputer 62 by means of a subroutine identified as "XDATA". The program then returns through entry point 135 to the main loop at block 104.

Returning to block 125, if the creep constants were determined there to be valid the program continues to block 140 where a check is made to determined if the weight reading obtained at block 104 as later corrected is within the positive range of A-D converter 80. If the weight data is determined to be valid the program proceeds to point 131 and to block 133 as described above. If the weight data is determined at block 140 to be invalid the program proceeds to block 142 where an "impossible" value (different from that at block 129) is loaded into the "WGT" register to flag invalid data. The program then proceeds through point 131 to block 133 as described above.

The procedure for calculation of current creep state and correction of the weight reading is shown in FIG. 6. For calculation purposes, equation (7) above is separated into several terms as follows:

$$DCP(T) = DCPA(T) + DCPB(T)$$

$$DCPA(T) = DCPA(T-1) + A$$

where one component of incremental creep, $$A = (MCPA * WGT - DCPA(T-1)) * AAF * C$$

$$DCPB(T) = DCPB(T-1) + B$$

where the other component of incremental creep, $$B = (MCPB * WGT - DCPB(T-1)) * BBF * C$$

and $$C = 1 + WGT * D$$

Finally, the creep compensated weight = WGT − DCP(T).

Referring now to FIG. 6, the creep compensation subroutine ADJFIN is entered at Point 140. Then at block 141 a check is made to determine if the host is a calibration system. If so, no creep calculation is made and the program delays at block 142 before returning to the main loop to use the time that would have been spent in the creep calculation and compensation. If, at block 141, the host is determined to be an application system, the program proceeds to the creep adjustment procedure at Point 143.

The creep constants are read from RAM 92 at block 145. Then, at block 146 a check is made to ensure that the stored constants have not changed since being loaded. If any constant is deemed invalid the program returns to the main loop. If all the constants are valid term C of the creep algorithm is calculated and stored at block 148. Then, at blocks 149 and 150 term A, the first, or A component of incremental creep, is calculated. The component of the current state of creep attributed to the A terms is then calculated at block 151 by adding term A to the existing, stored state of creep for the A components, DCPA(T−1). The result, DCPA(T), is stored for use as DCP(T−1) for the next weight reading.

At blocks 154 and 155 term B, the second or B component of incremental creep, is calculated. The component of the current state of creep attributed to the B term is then calculated at block 157 by adding term B to the stored state of creep for the B components, DCPB(T−1). The result, DCPB(T), is stored for use as DCP(T−1) for the next weight reading.

Finally, at block 160 the two components of the current state of creep, DCPA(T) and DCPB(T), are summed and substracted from the current weight reading, WGT, and the program returns to the main loop.

As mentioned above the constants MCPA, MCPB, AAF, BBF, and D are predetermined for each load cell apparatus 60 and stored for use in creep compensation. The constant D is a function of the microprocessor programmed for creep compensation and may be determined from equation 4 above and stored permanently in the microprocessor memory. The flow charts, FIGS. 7 and 8, illustrate an iterative process for calculating the other constants. The computer program attached hereto as Appendix B is a complete implementation of the calculation process. The program may be run on any Digital Equipment Corporation "VAX" computer as well as many other computers.

Prior to calculating the constants, actual creep measurements are obtained from the load cell apparatus 60 for which the constants are to be determined at 10, 30, 45, and 60 seconds and at 2, 3, 4, 5, 6, 7, 8, 10, 12, and 15 minutes after application of a test load. The creep measurements are obtained by reading the indicated load at these times, substracting the first reading from each of the others to measure the creep and adding to each result a portion (for example 20%) of the difference between the first and last reading to account for the creep at the 10 second point. The creep measurements are used for comparative purposes in calculating the constants, as described below.

Referring now to FIGS. 7 and 8, at block 200 an initial "best guess" for the values of the constants is entered. The constants do not vary greatly from apparatus to apparatus and a suitable "best guess" has been found to be $$MCPA = -.00013$$

$$AAF = .0008$$

$$MCPB = -.00017$$

$$BBF = .011$$

Then at block 202 one constant, AAF in this example, is varied until a "best fit" is found between calculated and measured creep. FIG. 8 illustrates this process which begins at block 205 by setting a value S equal to 1. The current creep state (creep error) is then calculated at block 246 from equation 7 using the initial best guess for the constants. At block 208, the least squares error is computed between the measured and calculated creep error. Then at block 210 the initial value of AAF is increased or decreased depending on the value of S and the least squares error is calculated again at block 212. At blocks 214 and 217 the latest error determined is compare with the previously determined errors to determine if the best fit has been obtained. If it has, the program returns to the main loop (FIG. 7) at block 220. If the best fit has not been obtained, a test is made at block 222 to determine if the latest determined error is less than the immediately preceding error. If it is, then the program returns to block 210, the value of AAF is again increased and the previous test repeated. If not, the sign of S is changed at block 223, the value of AAF is decreased at block 210 and the program steps repeated until a best fit is made at block 217 and the program returns to the main loop (FIG. 7) at block 220.

At block 220, the constant MCPA is varied according to the stops in FIG. 8 to obtain the best fit. Then at block 224 a check is made to determine if a best fit has been made for both AAF and MCPA. If not, AAF and then MCPA are again varied individually as in FIG. 8 to obtain best fits until a best fit is determined at block 226 for both AAF and MCPA. Then at block 229, the constant BBF is varied according to the procedure of FIG. 8 until a value for the constant produces a best fit between calculated and measured creep errors. The constant MCPB is then varied at block 231 in the manner shown in FIG. 8 until a best fit is obtained. A check is then made at block 233 to determine if a best fit has been obtained for both BBF and MCPB. If not, the program returns to block 229 and BBF and then MCPB are again varied individually as in FIG. 8 until a best fit is betermined at block 233 for both constants.

At this point values for all the constants have been selected from the different values tried to yield the best fit between calculated and measured creep errors. At block 235, the increment of change in the values of the constants is reduced and at block 238 a test is made to determine if the entire process has been repeated a desired number of times, that is, with a desired number, for example, 7, of increasingly smaller value increments for the constants. If not, the program returns to block 202 and the entire process is repeated with the new and smaller increment in values of the constants. When the process has been repeated the desired number of times (in this case 7) the final values for the constants are entered into the Non-Volatile RAM 92 (FIG. 5) (or the Memory 23 of FIG. 1) for use in creep predictions during the use of the weighing apparatus.

What is claimed is:

1. Weighing apparatus compensated for creep comprising a weighing mechanism, means for storing the creep state of said weighing mechanism, means for obtaining a representation of the weight on the weighing mechanism, means for predicting the creep increment resulting from said stored creep state and said weight, means for combining said creep increment with said stored creep state to determine a current creep state, means for combining said current creep state with said weight representation to provide a corrected weight representation, and means for storing said current creep state in place of said stored creep state.

2. Weighing apparatus as claimed in claim 1 wherein said means for predicting the creep increment includes means for storing a mathematical representation of creep increment as a function of weight and creep state, and means for calculating the creep increment resulting from said weight and said stored creep state.

3. Weighing apparatus as claimed in claim 2 wherein said creep increment is calculated from an expression of the form:

$$(MCP * WGT - DCP(T-1)) * (1 + WGT * D) * AT$$

where WGT is the weight representation, DCP(T−1) is the stored creep state and MCP, D, and AT are constants.

4. Weighing apparatus as claimed in claim 3 wherein said creep increment includes multiple additive components and each component is calculated from an expression of said form.

5. Weighing apparatus as claimed in claim 2 wherein said mathematical representation of creep increment includes at least one constant having a value determined for the particular weighing mechanism.

6. Weighing apparatus compensated for creep comprising a weighing mechanism, means for obtaining a representation of the weight on the weighing mechanism, means for predicting the creep state of the weighing mechanism using said weight representation, and means for combining the creep state with the weight representation to provide an indication of the weight on the weighing mechanism compensated for creep.

7. Weighing apparatus as claimed in claim 6 wherein weight representations are obtained continually and creep state is predicted continually using said weight representations.

8. Weighing apparatus as claimed in claim 7 wherein said means for continually predicting creep state includes means for storing each predicted creep state, means for calculating the creep increment between successively obtained weight representations, and means for combining the creep increment with the stored creep state to provide a new predicted creep state.

9. Weighing apparatus as claimed in claim 6 wherein creep state is calculated continually from an expression of the form $$(MCP*WGT-DCP(T-1)*(1+WGT*D)*AT+DCP(T-1)$$

where WGT is the weight representation, DCP(T−1) is the previous creep state and MCP, D and AT are constants.

10. Weighing apparatus as claimed in claim 6 wherein creep state is calculated continually from an expression of the form $$[(MCPA*WGT-DCPA(T-1))*AAF+(MCPB*WGT-DCPB(T-1)*BBF]*(1+WGT*D)+DCPA(T-1)+DCPB(T-1)$$

where WGT is the weight representation, DCPA(T−1) and DCPB(T−1) are components of the previous creep state and MCPA, AAF, MCPB, BBF and D are predetermined constants.

11. Weighing apparatus as claimed in claim 6 wherein said means for predicting the creep state includes a stored mathematical expression for predicting creep state in the particular weighing mechanism as a function of applied weight, time and the immediately previous creep state.

12. Weighing apparatus as claimed in claim 11 wherein said mathematical expression for predicting creep state includes at least one constant having a value determined for the particular weighing mechanism.

13. Weighing apparatus as claimed in claim 6 wherein said means for predicting the creep state of the weighing mechanism includes means for storing a mathematical representation of creep as a function of time, and means for calculating creep state using said mathematical representation.

14. A method of correcting the output of a weighing apparatus for creep comprising the steps of determining a mathematical representation of creep as a function of time for said weighing apparatus, continually obtaining representations of the weight on the weighing apparatus, continually predicting the creep state of the weighing apparatus utilizing the weight representations and said mathematical representation, and combining a predicted creep state with a weight representation to compensate for the effects of creep.

15. A method as claimed in claim 14 wherein said mathematical representation of creep includes at least one constant having a value determined for the particular weighing apparatus.

16. A method of correcting the output of a digital scale for creep which comprises repetitively performing the following sequence of steps:
(1) storing the creep state of the scale,
(2) obtaining an indication of the weight on the scale,
(3) predicting the creep increment since storing the creep state,
(4) combining the creep increment with the stored creep state to provide a current creep state,
(5) using the result of the combination to correct the weight indication.

17. A method as claimed in claim 16 including the step of determining a mathematical expression of creep as a function of time for said digital scale and predicting the creep increment by calculation using said mathematical expression.

18. A method as claimed in claim 17 wherein said mathematical expression of creep includes at least one constant having a value determined for the particular digital scale.

19. A method as claimed in claim 16 including the steps of determining a mathematical expression for predicting creep increment as a function of time, applied weight and the immediately previous creep state, storing said mathematical expression, and using said mathematical expression in predicting the creep increment of the digital scale.

20. Creep-compensated weighing apparatus comprising a weighing mechanism, means for storing a mathematical representation of creep as a function of time for said weighing mechanism, means for continually obtaining representations of the weight on the weighing mechanism, means for continually predicting the creep state of the weighing mechanism utilizing said weight representations and said mathematical representation, and means for combining a predicted creep state with a weight representation to provide an indication of the weight on said weighing mechanism compensated for creep.

21. Creep-compensated weighing apparatus as claimed in claim 20 wherein said mathematical representation of creep includes at least one constant having a value determined for the particular weighing mechanism.

22. A method of correcting the output of a force measuring apparatus for creep comprising the steps of obtaining a representation of the force applied to the force measuring apparatus, predicting the creep state of the force measuring apparatus using said force representation, and combining the predicted creep state with the force representation to provide an indication of the force applied to said force measuring apparatus compensated for the effects of creep.

23. A method as claimed in claim 22 including the steps of determining a mathematical representation for predicting creep as a function of time, applied weight and the immediately previous creep state, storing said mathematical representation, and using said mathematical representation in predicting the creep state of the force measuring apparatus.

24. A method as claimed in claim 22 including the steps of obtaining said force representations continually and predicting the creep state continually.

25. A method as claimed in claim 24 wherein the creep state is predicted continually by storing each predicted creep state, predicting the creep increment between successively obtained force representations, and combining the creep increment with the stored predicted creep state to provide a new predicted creep state.

26. A method as claimed in claim 22 including the step of determining a mathematical representation for creep as a function of time for said force measuring apparatus and using said mathematical representation in predicting the creep state.

27. A method as claimed in claim 26 wherein said mathematical representation is an expression of the form $$(MCP*WGT-DCP(T-1))*(1+WGT*D)*AT+DCP(T-1)$$

where WGT is the force representation, DCP(T−1) is the previous creep state and MCP, AT and D are constants.

28. A method as claimed in claim 26 wherein said mathematical representation for creep includes at least one constant having a value determined for the particular force measuring apparatus.

* * * * *